Nov. 20, 1962 W. N. CARROLL ET AL 3,064,896

ASYNCHRONOUS DIVISION APPARATUS

Filed Nov. 20, 1959 2 Sheets-Sheet 1

INVENTORS
WILLIAM N. CARROLL
CHARLES J. TILTON

BY Edgar H. Kent
ATTORNEY 3,064,896
ASYNCHRONOUS DIVISION APPARATUS
William N. Carroll, Rhinebeck, and Charles J. Tilton, Hyde Park, N.Y., assignors to International Business Machines Corporation, New York, N.Y., a corporation of New York
Filed Nov. 20, 1959, Ser. No. 854,284
11 Claims. (Cl. 235—164)

Figure 1:
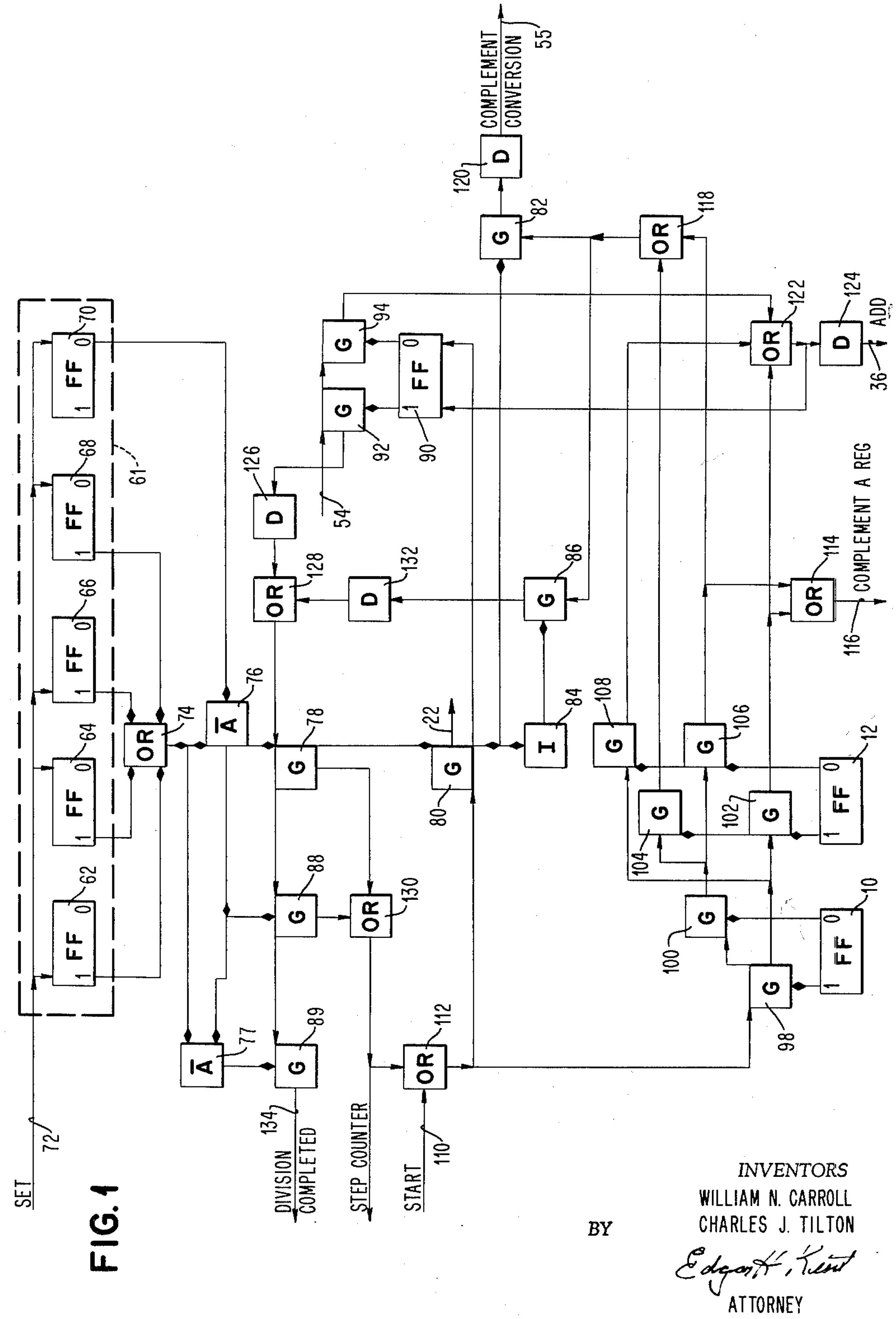

This invention relates to data processing machines and more particularly to apparatus capable of performing division operations in data processing machines of the electronic digital computer type.

In high-speed electronic digital computers the length of time required to perform any given operation directly affects the overall speed of the computer and much attention has been accorded the design of the components utilized therein and the operations of logical combinations thereof to maximize the data handling speed of the overall system. It is a primary object of the invention to provide improved apparatus capable of performing binary division substantially at a faster rate than heretofore possible. Binary division is a difficult and time consuming operation to perform in conventionally designed computers and in some equipments circuitry for performing such manipulations has been omitted due to the complexities involved. When division circuitry has been incorporated the nonrestoring type of binary division operation has been favored as it eliminates certain steps necessary in the restoring type and hence each operation may be completed more rapidly.

The obtaining of the quotient in binary division is accomplished through successive subtractions of the divisor from appropriate orders of the dividend. The numerical word used in the computer associated with the hereinafter described apparatus consists of 20 bits, a sign bit and 19 data bits. The sign bit indicates the polarity of the number, it being ONE if the number is negative and ZERO if the number is positive. All the numerical words in this system have an absolute magnitude less than unity and therefore the binary point is located between the sign bit and bit 1. As the quotient must be less than unity in order to comply with this criterion the divisor must be greater than the dividend. In a typical nonrestoring type of binary division operation the divisor is placed in an A Register and the dividend in a combined Accumulator-B Register. Following conventionally accomplished appropriate transfer and sign control operations the numbers in both registers are positive and the apparatus is prepared to perform the requisite partial quotient iterations with the use of adder circuitry. The following steps are performed in the first iteration. The A Register is complemented so that the signs of the two numbers are made unlike and the Accumulator-B Register is shifted left one position (forcing a ZERO into the least significant stage of the B Register). As the number in the A Register is negative it must be effectively converted to 2's complement form so that the difference resulting from the subtraction will be correct whether or not there is an end carry of ONE. After this conversion the numbers in the A Register and the Accumulator are added and a carry out of ONE from the Sign stage of the Accumulator indicates the difference is positive. This sequence of steps produces the first bit of the quotient and that bit is stored in the least significant stage of the B Register. The sequence is repeated for the total number of partial quotient iteration required, that number being a function of the word length. If the last iteration results in a ZERO carry out this indicates that the final difference is negative and an additional corrective step must be taken. Upon completion of this step the division has been completely performed.

In high-speed digital computer operations which incorporated binary division circuitry the division process has been performed in response to system timing pulses resulting in a fixed length instruction. However there are certain steps which are not necessarily performed during each partial quotient iteration and the lengths of many of the steps involved depend upon characteristics of the specific quantities that are being manipulated. For example the length of time required for each addition step involved in the iteration is dependent upon the number of carries that are generated. Conventionally the summing circuitry has been designed to insure adequate time for the maximum number of carries whereas the usual number of carries involved in a summation is only a small fraction of that maximum.

Accordingly, another object of this invention is to provide an improved apparatus capable for performing binary division at a rate independent of the associated computer system timing.

A more specific object of the invention is to provide in a binary division system apparatus capable of sensing the completion of each addition operation to enable the system to proceed immediately to the operations subsequent thereto.

Still another object of the invention is to provide in a binary division system a control apparatus which is responsive to the completion of each step of the partial quotient iterations and enables the immediate initiation of the next step thereof.

Still another object of the invention is to provide in a binary division system means for effectively converting the divisor when it is in 1's complement form to 2's complement form rapidly and with minimum delays so that the division operation may be carried out with maximum dispatch.

In accordance with the invention there is provided an asynchronous binary division system which, in response to a Divide instruction, initiates a division operation and enables it to proceed to completion as rapidly as possible and independently of the timing control normally provided by the associated computer. This results in an instruction that is of a variable length dependent on the characteristics of the numbers being divided. The system utilizes the principles of nonrestoring binary division with the requisite sampling and shifting of the numbers to provide the proper quantities for manipulation during each partial quotient iteration in response to internally generated control pulses. Apparatus for the rapid, effective conversion of the divisor when it is in 1's complement form to 2's complement form is provided and the system incorporates high-speed adder circuitry which signals the completion of each addition operation, thus enabling the next step of the iteration to be immediately commenced. While reliable high-speed components are utilized in the preferred embodiment of the system the logical organization of the invention provides marked overall savings in the length of time required for each division operation. For example, the system when handling a twenty bit word, constructed in accordance with the preferred embodiment of the invention, reduces the Divide instruction time by thirty-eight percent and in a forty-eight bit word system the instruction execution time is forty-two percent of that required when utilizing a conventional fixed length instruction.

Figure 2:
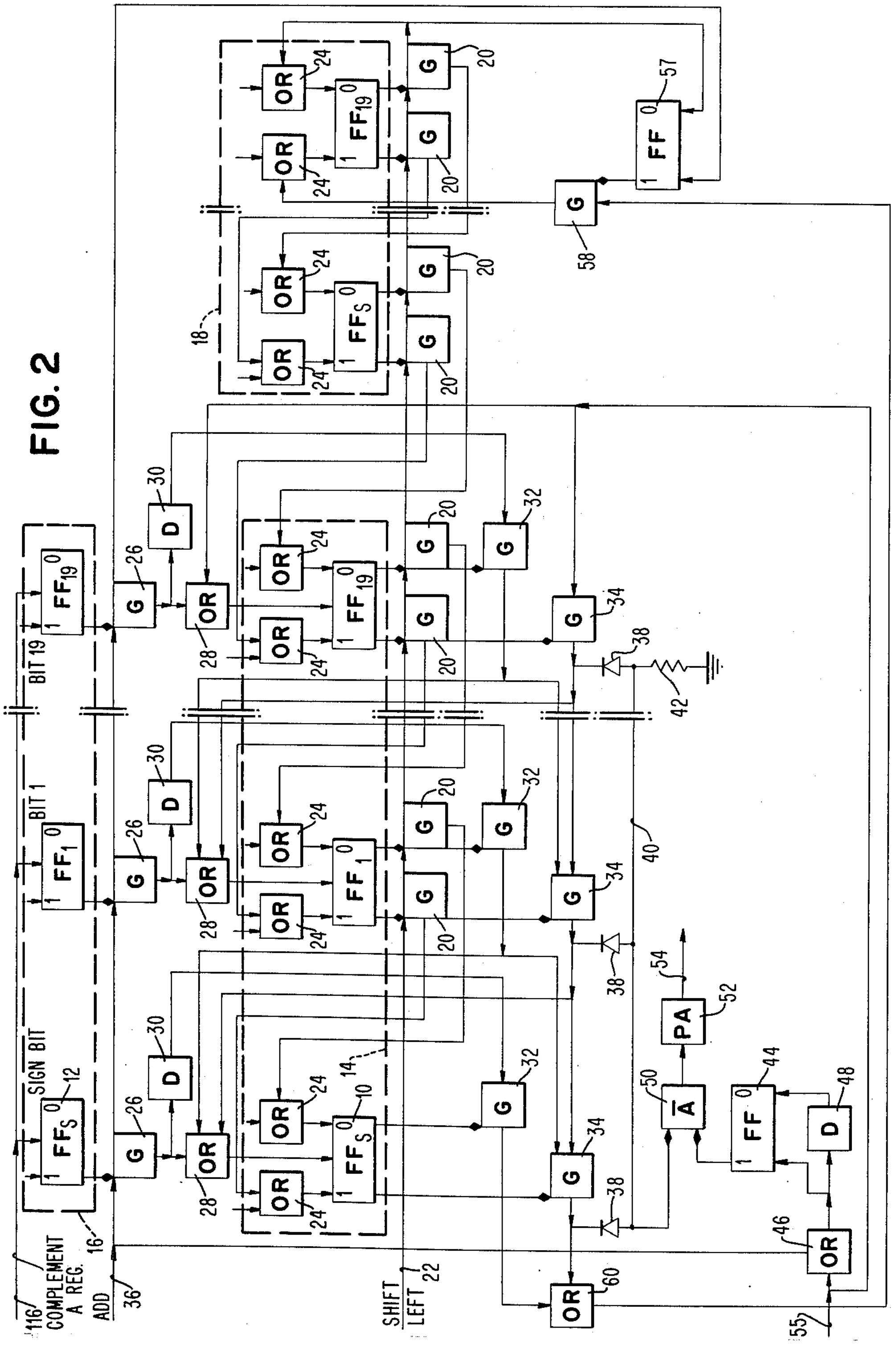

Other objects and advantages of the invention will be seen as the following description of a preferred embodiment thereof progresses in conjunction with the drawings, in which:

FIG. 1 is a block diagram illustrating in schematic form the control circuitry utilized for executing a Divide instruction in accordance with the preferred embodiment of the invention; and FIG. 2 is a block diagram illustrating in schematic form the adder circuitry and storage registers associated with the division control circuitry of FIG. 1.

In these figures a conventional filled in arrowhead is employed on lines to indicate (1) a circuit connection, (2) energization with a pulse and (3) the direction of pulse travel. A diamond-shaped arrowhead indicates (1) a circuit connection, (2) energization with a D.C. level, and (3) the direction of application of that level. Boldface characters appearing within a block identify the common name of the circuit represented, that is, FF designates a flip-flop, G a gate circuit, OR a logical OR circuit, I an inverter, D a delay line and $\bar{A}$ a logical NOT AND circuit. A variety of circuits suitable for the performance of each of these functions is known in the art. However the preferred type of components are disclosed in the copending applications S.N. 824,119 filed in the name of Carroll A. Andrews et al. on June 30, 1959 and entitled Magnetic Core Transfer Matrix and S.N. 824,105 filed in the name of C. J. Tilton on June 30, 1959 and entitled Asynchronous Multiplier.

The control circuitry illustrated in FIG. 1 is responsive to a Divide instruction signal and controls the entire division operation independently of the normal computer timing pulses. Conventionally this signal emanates from a Command Generator in the Instruction Control circuitry of the associated computer. The logical organization of a suitable type of computer in which the apparatus of this invention may be incorporated is disclosed in the copending application S.N. 570,199 filed in the name of Harold D. Ross et al. on March 7, 1956 and entitled Electronic Data Processing Machine now Patent No. 2,914,248, issued November 24, 1959. In FIG. 1 there are shown two flip-flops 10, 12 which represent the sign stages of the Accumulator 14 and the A Register 16 respectively and are adapted to initially store the binary signals representative of the signs of the dividend and the divisor respectively.

These storage registers are shown in FIG. 2. In the described embodiment the Accumulator 14, the A Register 16 and the B Register 18 each are twenty bit registers and include a sign bit stage and data bit stages 1–19. In order to simplify the drawing stages 2–18 have been omitted from the showing of the A Register and the Accumulator and stages 1–18 have been omitted from the showing of the B Register, the omitted stages being substantially identical with the stages that are shown.

The Accumulator 14 and the B Register 18 are susceptible to organization as a single register and there is associated with those registers a series of gates 20 which enable the number stored in the combined register to be shifted left one stage when the gates are sampled by a pulse on line 22 by transfer through connected OR circuits 24. Adder circuitry is interposed between the corresponding stages of the A Register and the Accumulator and this circuitry is preferably of the type described in detail in the copending patent application S.N. 823,996 filed in the name of E. T. Hall et al. on June 30, 1959 and entitled Adder Circuit (IBM Docket 13058). Each stage of this circuitry includes a transfer gate 26 which is conditioned by the ONE level from the associated A Register stage; an OR circuit 28, which applies signals to the complement input of associated Accumulator stage; a delay line 30, a slow carry gate 32 and a fast carry gate 34. To perform an addition the number held in the A Register 16 is transferred in response to a pulse on line 36 in a broadside or parallel transfer operation through gates 26 and OR circuits 28 to the complement inputs of the flip-flops in the Accumulator 14. Each transferred pulse is applied through delay circuit 30 (which allows the Accumulator flip-flops to resolve) and samples the slow carry gate which is conditioned by the ZERO level of the associated Accumulator flip-flop. If the flip-flop is in the ZERO condition after being complemented (indicating that the ONE transferred from the A Register was added to a ONE stored in the Accumulator and a carry must be generated) the pulse is passed and applied through the OR circuit 28 of the next higher stage to the complementing input of the flip-flop of that stage and to the fast carry gate 34 on the ONE output side of that flip-flop. This fast carry can propagate along the fast carry lines until a stage in the ZERO state is reached and it will then stop. As no stage can generate nor pass more than one carry per addition process the maximum duration of the carry propagation is once around the loop.

Associated with this adder circuitry is a carry completion detection circuit which provides a signal upon the completion of each adder operation. The detection circuit comprises a plurality of diodes 38 connected together to form a negative OR circuit. One diode is associated with each stage of the adder circuitry with its cathode connected to the output pulse line of the fast carry gate of that stage. The anodes of the diodes are tied together by line 40 which is connected to ground through a 120 ohm resistor 42. The carry completion circuitry also includes a flip-flop 44 which is set by the Add pulse applied thereto from line 36 through OR circuit 46 and then is cleared when that pulse is passed by delay circuit 48. The ONE output level of flip-flop 44 and the output of the OR diode network from line 40 are connected as inputs to a NOT AND circuit 50, a logical circuit that has a down output level only when all its input levels are up. When flip-flop 44 is set its one output level is down, at approximately −3.5 volts. The pulses propagated on the fast carry lines are also at approximately the same voltage. As the duration of a fast carry pulse is approximately four times the length of the time delay in propagation introduced by each fast carry gate the carry pulses applied to the diode OR circuit will overlap and each diode will be turned on successively as the negative pulse propagates through the fast carry gates. This produces a substantially constant −3.5 volt output level on line 40 which exists as long as any of the gates pass a carry pulse.

In operation the ONE output level of flip-flop 44 remains down until the Accumulator flip-flops have resolved and the generation of fast carries has been initiated. Then the pulse passed by delay unit 48 clears flip-flop 44 so that its ONE output level rises to ground. However, the other input to the NOT AND circuit is down at this time if any carries are generated and it remains down until the fast carry propagation has terminated. As soon as the fast carry propagation does terminate the voltage on line 40 rises to ground potential, permitting the output level of the NOT AND circuit to fall. When the output level of the NOT AND circuit does fall a pulse produced which is amplified and shaped by one or more pulse amplifiers 52 and applied on line 54 for use in the control circuitry to indicate the completion of the addition operation.

Another feature of the circuitry shown in FIG. 2 is the incorporation of apparatus for effectively converting the divisor when it is in 1's complement form to 2's complement form in a rapid manner. This is accomplished by applying a signal on line 55 to the least significant stage of the Accumulator 14 (stage 19) to complement that stage and simultaneously to the fast carry gate 34 of the stage to immediately initiate propagation of carries if necessary. This single carry propagates through the series of fast carry gates as far as is necessary to complete the addition process. The carry completion circuitry is rendered operative during this operation by the application of the 2's complement conversion pulse on line 55 through OR circuit 46 to set flip-flop 44 and generates a signal indicating completion of the conversion operation as described above. As the next step in the division operation is an addition of the contents of the A Register 16 to the contents of the Accumulator 42, a simple and rapidly effective conversion of the divisor in the A Register from 1's complement form to 2's complement form has been accomplished.

One bit of the quotient is generated as a result of each summing operation. If the remainder (stored in the Accumulator) is positive the partial quotient bit is ONE and if it is negative the partial quotient bit is ZERO. This bit is obtained from the carry gates associated with the Sign stage of the Accumulator 14 and is passed through OR circuit 60 to set the bit 19 stage of the B Register 18 to ONE when a carry is generated. A Divide Control flip-flop 57 is provided to supervise this operation and other normal addition operations. Flip-flop 57 is set by the Add pulse on line 36, conditioning gate 58, and is cleared by the Shift Left pulse on line 22. This logic insures that the Add pulse (line 36) can cause a ONE to be written into B Register bit 19 stage as gate 58 is conditioned.

The division operation proceeds with the requiste number of partial quotient iterations being performed, each iteration including a subtraction of the divisor from a different order of the dividend and a storing of the partial quotient in the B Register.

The entire division operation is under the supervision of the control circuit shown in FIG. 1. The circuitry includes a counter 61 comprising five flip-flops, 62, 64, 66, 68 and 70 which are initially set to a count of twenty by a pulse on line 72, as indicated. This counter is stepped at the completion of each partial quotient iteration in the conventional manner (circuitry not shown). The counter thus is set to the requisite number of partial quotient iterations and provision is made for the conditional correction of the remainder, if necesary as hereinafter described. The ONE output levels of flip-flops 62, 64, 66 and 68 are applied through an OR circuit 74 to provide a conditioning level whenever the counter contents are between twenty and one. The resulting level conditions one input of NOT AND circuits 76 and 77, gates 78, 80 and 82 and, through an inverter 84, gate 86. The output of NOT AND circuit 76 conditions gate 88 and one input of NOT AND circuit 77 and the output of NOT AND circuit 77 conditions gate 89.

A control flip-flop 90 is provided for supervising the addition operations required in each partial quotient iteration. The output levels of the flip-flop 90 condition gates 92 and 94.

In each partial quotient iteration the polarities of the remainder and the divisor must be known and in order to determine this there are provided gates 98 and 100 which are conditioned by output levels from the Accumulator Sign stage flip-flop 10 and gates 102, 104, 106 and 108 which are conditioned by output levels from the A Register Sign stage flip-flop 12.

The division operation is initiated by a pulse from the Computer Instruction Control on line 110 after the divisor and the dividend have been placed in the A Register and the combined Accumulator-B Register respectively. Initially the contents of both registers are positive so that both the Accumulator flip-flop 10 and the A Register flip-flop 12 are set to the ZERO state. The division operation initiating pulse, passed through OR circuit 112, thus is passed by gates 100 and 106. As each partial quotient iteration requires that the signs of the contents of the A Register and Accumulator-B Register be unlike (so that the divisor may be subtracted from the number stored in the Accumulator) the pulse passed by gate 106 is applied through OR circuit 114 on line 116 to the complement inputs of the A Register (FIG. 2) to complement the number stored therein.

The pulse from OR circuit 112 also samples gate 80 which is conditioned by the level from the OR circuit 74 and a shift pulse is passed on line 22 to shift the contents of the combined Accumulator-B Register left one position and force a ZERO into the B Register bit 19 stage (see FIG. 2) The pulse also clears the control flip-flop 90, conditioning gate 94.

As the A Register is now negative (in 1's complement form) the value must be converted to 2's complement form so that the correct difference resulting from the subtraction will be stored in the Accumulator irrespective of whether or not an End Carry is generated. The pulse passed by gate 106 is applied through OR circuit 118 to the gate 82. As that gate is conditioned by the counter level from OR circuit 74, a 2's Complement Conversion pulse is passed to delay unit 120 (which is provided to insure the resolution of the Accumulator-B Register flip-flops following the shift before any further disturbance of the Accumulator) and applied on line 55 for application through OR circuit 28 (FIG. 2) directly to Stage 19 of the Accumulator to add ONE to the quantity stored therein. That pulse is also applied through OR circuit 46 to initiate the operation of the carry completion circuitry. Immediately upon completion of the conversion operation a pulse is generated on line 54 which samples gates 92 and 94 associated with the output level of the control flip-flop 90. As this flip-flop was cleared by the pulse passed by OR circuit 112 the gate 94 is conditioned and passes the pulse to OR circuit 122 and delay unit 124 (which insures resolution of the Accumulator flip-flops after completion of the conversion operation). The output pulse from OR circuit 122 also sets the control flip-flop 90, conditioning gate 92. The delayed pulse is then passed on line 36 and samples the transfer gates 26 (FIG. 2), initiating an addition operation. On completion of this addition the carry completion circuitry again generates a pulse on line 54 which samples gates 92 and 94. The control flip-flop 90 has now conditioned gate 92 and the pulse is passed through delay unit 126 (provided to insure that the Accumulator flip-flops have resolved after the addition operation) and OR circuit 128 to sample the gates 78 and 88. As the output level of the OR circuit 74 is conditioning gate 78 that device passes the pulse through OR circuit 130 as a counter stepping pulse to reduce the contents of the counter 61 by ONE and through OR circuit 112 to immediately initiate the next partial quotient iteration. (A delay may be provided in the counter step line if necessary to insure that the iteration initiating pulse passed by OR circuit 112 samples gates 80, 82 and 86 before the counter is stepped.)

The result of the addition of the contents of the A Register and the Accumulator is stored in the Accumulator as a partial quotient remainder and if there is an End Carry a partial quotient pulse is passed which sets the bit 19 stage of the B Register to ONE. It will be noted that the control circuitry enables the execution of the partial quotient iteration at the maximum speed allowed by the components untlized in the storage registers and adder circuitry and operates asynchronously, in complete independence of computer timing signals. A signal generated at the end of each iteration immediately initiates the next and thus the entire division operation may proceed to completion in much shorter time than is possible with a system that is controlled by computer timing pulses.

Subsequent operations of the control circuit are under the general control of Counter 61 and are determined by the signs of the divisor stored in the A Register and the remainder stored in the Accumulator. During each iteration the Sign stages of the Accumulator and A Register are sampled and made unlike if necessary by complementing the A Register. Simultaneously the Accumulator-B Register is being shifted one place to the left by a pulse on line 22. If the Accumulator Sign stage is ZERO and the A Register Sign stage is ZERO the control circuit causes the A Register to be complemented to make the signs unlike and as the result is in 1's complement form it is then effectively converted to 2's complement form by the pulse on line 55. After this is completed the addition proceeds normally. If the value in the Accumulator is positive (Sign stage is ZERO) and the number in the A Register is negative (Sign stage is ONE) the partial quotient iteration initiating pulse is passed by gate 104 directly to OR circuit 118 to initiate a 2's Complement Conversion without complementing the A Register as the signs thereof are already unlike. If both numbers are negative the initiating pulse is passed by gate 102 to complement the A Register. As that value is then positive no 2's Complement Conversion is necessary and a pulse is passed by OR circuit 122 through delay unit 124 to directly add the contents of the A Register to the Accumulator. Finally if the number in the Accumulator is negative and the number in the A Register is positive the sampling pulse is passed by gate 108 directly to initiate the summing operation through OR circuit 122 and delay unit 124.

The counter stepping pulse generated at the start of the twentieth iteration in the described embodiment is adapted to step the Counter 61 to ONE. However due to the delay involved in the resolution of the counter flip-flop 68 the conditioning level from OR circuit 74 is not removed until after gates 80 and 82 have been sampled. Thus the number in the Accumulator is shifted left one place and a 2's Complement Conversion pulse is generated if necessary. Also gate 86 is not conditioned by the output of inverter 84 until after the occurrence of the sampling pulse which may be applied thereto during this iteration. When the Counter is stepped to ONE the conditioning level from OR circuit 74 is removed, gate 86 is conditioned and NOT AND circiut 76 has an operative output level. The iteration proceeds normally and upon completion of the addition operation the Carry Completion pulse on line 54 is passed by gate 92 through delay 126 and OR circuit 128 and samples gate 88 conditioned by the output of NOT AND circuit 76. The pulse is passed through OR circuit 130 to OR circuit 112 as the final iteration initiating pulse and also as a Counter Stepping pulse to step the Counter 61 to ZERO.

After the circuitry has performed the required number of partial quotient iterations one additional step may be necessary conditional on the sign of the remainder stored in the Accumulator. If that remainder is negative the last trial subtraction has overdrawn the remainder by the amount of the divisor. In order to correct this the divisor must be added back into the remainder. The final iteration initiating pulse is passed through OR circuit 112 and clears the control flip-flop 90. As gate 80 is not conditioned (Counter-ONE at this instant) no Shift Left pulse is generated. If the Accumulator is positive no addition is required and the pulse is passed by either gate 104 or gate 106 through OR circuit 118 and gate 86 (conditioned by the level from the inverter 84), through delay circuit 132 (which delays the pulse until the Counter 60 has resolved to ZERO), and OR circuit 128, to sample gates 78, 88 and 89. Gate 89 is conditioned when the Counter is ZERO by the output level from NOT AND circuit 77 and the pulse thus is passed on line 134 to the Instruction Control circuit to signal the completion of the Division operation. If the contents of the Accumulator are negative, however, the sampling pulse is passed by gate 98 through either gate 102 or 108, the A Register is complemented if necessary, and an addition operation is initiated by the pulse passed through OR circuit 122. The addition initiating pulse sets the flip-flop 90 and when the addition is completed the carry completion pulse on line 54 is passed by gate 92 through delay unit 126, OR circuit 128, and gate 89 as an indication of the termination of the division operation. The division process is now complete, except for affixing the correct sign to the quotient which is handled conventionally through sign control circuitry (not shown).

Thus the invention enables the performance of nonrestoring binary division in an electronic digital computer system much more rapidly than heretofore possible. The entire division operation is controlled in an asynchronous manner by a simple control circuitry that operates entirely independently of the associated computer timing apparatus. Each step of the partial quotient iteration is initiated as soon as the previous step is completed, there being means associated with the various registers for signalling the completion of variable length manipulations of words stored therein. Further an additional increase in speed is obtained where a conversion of the divisor from 1's complement form to 2's complement form is required by manipulation of the bits stored in the Accumulator. Thus it will be seen that the system according to the invention provides marked improvements in apparatus for performing binary division. While a preferred embodiment of the invention has been shown and described herein various modifications thereof will be obvious to those skilled in the art and it will be understood that the invention is not intended to be limited thereto or to details thereof and departures may be made therefrom within the spirit and scope of the invention as defined in the claims.

We claim:

1. In an electronic digital computer having means for generating a series of timing signals normally employed for control of signal manipulation by said computer, first register means having a plurality of stages for storing a first set of signals representative of a divisor, second register means having a plurality of stages for initially storing a second set of signals representative of a dividend and subsequently storing signals representative of a partial remainder, adder means responsive to the signals held in said first and second registers for performing a partial quotient iteration and generating signals representative of a partial remainder and a quotient digit as a result of each iteration, the combination of means associated with said adder means for sensing carries propagated during each adder iteration, means for providing a completion signal at the termination of carry propagation in each operation of said adder means, and control apparatus initially responsive to a computer generated division operation initiating signal and subsequently responsive to each said completion signal for actuating said adder means to immediately initiate the next partial quotient iteration required for the division of said dividend by said divisor.

2. The apparatus as claimed in claim 1 wherein said control apparatus further includes sequentially operative means adapted to be actuated during each partial quotient iteration comprising means to sample the polarities of the numbers stored in said first and second register means, first means responsive to said sampling means to initiate the effective doubling of the number held in said second register, and second means responsive to said sampling means to initiate the effective conversion of the number in said first register means from 1's complement form to 2's complement form where required.

3. In a digital computer, apparatus for performing nonrestoring binary division comprising first register means having a plurality of stages for storing binary signals representative of a divisor, combined register means including second register means and third register means for storing binary signals representative of a dividend, said second and third register means each having a number of stages corresponding to the stages of said first register means, a pulse type adder adapted to perform a series of partial quotient iterations by repetitively transferring the contents of said first register means in parallel to the contents of said second register means to provide a sum of these contents whereby a partial remainder is stored in said second register means and a partial quotient is stored in said third register means, means for generating a signal indicative of the completion of each summing operation performed by said adder, and control apparatus operative independently of computer generated timing signals and responsive to a computer generated division operation initiating signal for controlling each partial quotient iteration and causing the performance of each step thereof as soon as the prior step is completed comprising a counter adapted to be set to indicate the requisite number of partial quotient iterations, means operative during each partial quotient iteration to initiate the operation of said adder to subtract contents of said first register means from contents of said second register means and means responsive to said signal generating means to step said counter and to immediately initiate the next partial quotient iteration.

4. The apparatus as claimed in claim 3 and further including means for sensing the numbers stored in said first and second registers prior to the initiation of said subtraction operation, and means responsive to said sensing means for effectively converting the binary number stored in said first register means from 1's complement form to 2's complement form by simultaneously complementing the least significant stage of said second register means and initiating the generation of any required carries.

5. In an electronic digital computer, apparatus for performing nonrestoring binary division comprising first register means having a plurality of stages for storing binary signals representative of a divisor, a combined register including second register means and third register means for storing binary signals representative of a dividend, said second and third register means each having a number of stages corresponding to the stages of said first register means, an adder adapted to perform a series of partial quotient iterations, each iteration including the steps of adding the contents of said first register means to the contents of said second register means in a summing operation and storing a partial remainder in second register means and a partial quotient in said third register means, means for generating a signal at the completion of carry propagation in each summing operation performed by said adder, and control circuitry operative independently of computer timing signals including an iteration controlling counter stepped by said carry completion signal.

and means responsive to said carry completion signal for selectively revising the numbers then stored in said first and second register means and initiating the operation of said adder to perform a partial quotient iteration.

6. The apparatus as claimed in claim 14 where in said selective revision means includes means for effectively converting the binary number stored in said first register means from 1's complement form to 2's, complement form by simultaneously complementing the least significant stage of said second register means and initiating the generation of any required carries.

7. The apparatus as claimed in claim 14 wherein said adder is a pulse type adder having stages corresponding to the stages of said first register means and which includes circuitry adapted to enable the transfer in parallel of the contents of said first register means to said second register means in a partial addition operation and said adder circuitry includes a carry gate associated with each stage thereof and transfer means associated with each carry gate for propagating carries between adjacent stages of said adder, and said signal generating means includes means for sensing said transfer means to determine when the carries propagated as a result of a summing operation terminate, said signal generating means being adapted to generate a signal indicative of the completion of said summing operation at that time.

8. The apparatus as claimed in claim 7 wherein said sensing means includes an OR circuit including a unidirectionally conductive device coupled to each said transfer means.

9. The apparatus as claimed in claim 7 wherein said selective revision means includes means for effectively converting the binary number stored in said first register means from 1's complement form to 2's complement form by simultaneously complementing the least significant stage of said second register means and sampling a carry gate associated with that stage to initiate the generation of any required carries.

10. In an electronic digital computer having means for generating a series of timing pulses normally employed for control of signal manipulation by said computer, first register means having a plurality of stages for storing a set of signals representative of a first number, second register means having a plurality of stages for storing a set of signals representative of a second number and adder means responsive to the signals held in said first and second registers for arithmetically combining those signals in an arithmetic iteration of variable time duration dependent on the carries generated during each adder iteration, the combination of means associated with said adder means for sensing carries propagated during each adder iteration, means for providing a completion signal at the termination of carry propagation in each iteration by said adder means, and control apparatus operative independently of said computer generated timing signals for controlling said adder means to perform a series of arithmetic iterations, said control apparatus being initially responsive to a computer generated signal specifying an arithmetic operation to be performed on said first and second numbers and being subsequently responsive to each said completion signal for actuating said adder means to initiate the next iteration required for the specified arithmetic operation.

11. In an electronic digital computer having means for generating a series of timing signals normally employed for control of signal manipulation by said computer, calculating apparatus for performing division on numbers expressed in binary notation independently of said timing signals, comprising iteration control means, a first storage register having a plurality of stages settable to represent a dividend value, a second storage register having a plurality of stages settable to represent a divisor value, a binary adder operatively connected to said first and second storage registers to add the values stored in said registers and including means to generate an addition completion signal at the end of each addition operation, sign comparing means for indicating the relative signs of the values stored in said first and second storage registers, means operative to shift the value stored in one of said storage registers by one stage with respect to the value in the other storage register, value modifying means selectively operable to complement the value stored in one of said storage registers and to effectively convert the value stored in one of said registers from 1's complement form to 2's complement form, first gating means responsive to said sign comparing means being in a first state at the beginning of an iteration for selectively operating said value modifying means and initiating operation of said adder means directly upon completion of the modification operation to add the modified values stored in said storage registers, second gating means responsive to said sign comparing means being in a second state at the beginning of an iteration for directly initiating operation of said adder means to add the unmodified values stored in said storage registers, means to store a quotient digit in each iteration as the result of the adder operation, and means to channel said addition completion signal generated at the completion of each said adder operation to initiate directly the next iteration of said calculating apparatus, including means to channel said completion signal to step said interation control means, to operate said shift means, and to sample the gating means responsive to said sign comparing means.

References Cited in the file of this patent

UNITED STATES PATENTS

| | | |
|---|---|---|
| 2,668,661 | Stibitz | Feb. 9, 1954 |
| 2,928,076 | Greene | Mar. 8, 1960 |
| 2,954,166 | Eckdahl et al. | Sept. 27, 1960 |

UNITED STATES PATENT OFFICE

CERTIFICATE OF CORRECTION

Patent No. 3,064,896 November 20, 1962

William N. Carroll et al.

It is hereby certified that error appears in the above numbered patent requiring correction and that the said Letters Patent should read as corrected below.

Column 9, lines 46 and 53, for the claim reference numeral "14", each occurrence, read -- 5 --.

Signed and sealed this 28th day of May 1963.

(SEAL)
Attest:

ERNEST W. SWIDER
Attesting Officer

DAVID L. LADD
Commissioner of Patents